Oct. 9, 1923.
T. J. BARKER
RUBBER TIRE CORE
Filed Aug. 11, 1920
1,470,048
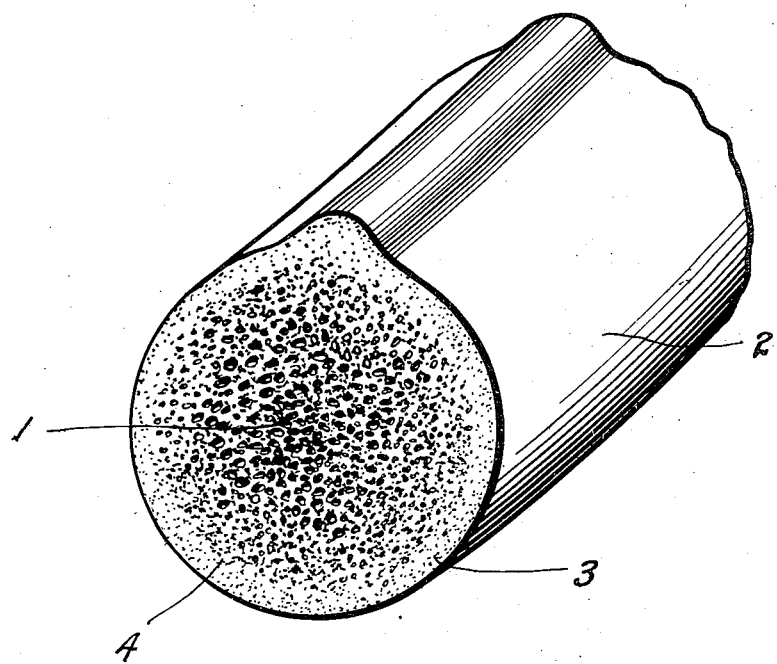
INVENTOR
Thomas J. Barker
BY
ATTORNEY Patented Oct. 9, 1923.

1,470,048

UNITED STATES PATENT OFFICE.

THOMAS J. BARKER, OF KANSAS CITY, MISSOURI.

RUBBER-TIRE CORE.

Application filed August 11, 1920. Serial No. 402,839.

*To all whom it may concern:*

Be it known that I, THOMAS J. BARKER, a citizen of the United States, residing at Kansas City, in the county of Jackson and State of Missouri, have invented certain new and useful Improvements in Rubber-Tire Cores; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention relates to a rubber tire core.

The object of the present invention is to improve the construction of rubber cores for automobile and various other vehicle tires and to provide a simple, practical and efficient rubber tire core which will possess a degree of resiliency in excess of the natural resiliency of commercial rubber. The advantage of utilizing air in tires is well known, as is also the disadvantage that the tire is liable to become deflated due to punctures, blow-outs and the like.

It is the primary object of the present invention to provide a rubber core which may take the place of the ordinary inner tube of the tire and provide the inherent advantages of an air tube without the disadvantages of the liability of punctures.

In order to understand the construction of the core reference should be had to the accompanying drawing, in which:

The figure is a fragmentary perspective view of a portion of a core constructed in accordance with this invention, a cross section of the core being shown.

The core 2, which is designed to be used in an ordinary outer tube or casing, is provided with gas cells 5 and when molding the core gas producing ingredients are included in the mixture for forming the said gas cells 5. The formation of gas within the core 2 creates pressure in all directions against the inner wall of the core 2 and the center 1 of the core 2 has larger cells than are present at the perimeter 3. There is a relative dense portion 4 of appreciable thickness at the perimeter 3 of the core 2 and a less dense portion at the center 1. Therefore, the inner central portion of the core 2 has a greater resiliency and flexibility than the outer portion although there are gas pockets of reduced size adjacent to the surface of the core. The formation of the gas cells or interstices increase the resiliency of the core and such resiliency is materially in excess of the resiliency of the ordinary commercial rubber, and the gas confined within the pockets or cells of the core will enable the core to admirably take the place of the commonly used inner tube and the said core will adequately serve the purpose of providing the necessary resiliency for the wheel and at the same time there will be no liability of the tire becoming accidentally deflated by a puncture or blow-out of the core. The cross section of the core, for a considerable depth from the surface, is of greater density than the center of the core, although the core is substantially solid throughout, the inner portion of the core being of less density than the outer portion to cause greater resiliency and flexibility of the said inner or central portion. In actual practice the core in cross section resembles a sponge-like mass of fine texture, although the webs between the cells or interstices are in most instances unbroken so that the little gas cells are formed in which the generated gas is retained, whereby a high degree of resiliency is present in the fininshed product.

The core is approximately the diameter of the inner diameter of the shoe or tire casing for which it is designed and, therefore, when it is placed in the shoe or casing it snugly fits therein, admirably serving as a substitute for the inner air tube of the pneumatic tire. While the core possesses a high degree of resiliency it is comparatively soft and thereby may be utilized without liability of the rim cutting the shoe or tire casing.

What I claim and desire to secure by Letters-Patent is:

1. As a new article of manufacture, a core for tires consisting of an integral, circular ring having a denser cross section at its perimeter than at its center, the ring being made by forming gas pockets in the center of the ring while the core is being made.

2. As a new article of manufacture, a core for tires consisting of an integral circular ring having gas cells therein, the gas cells near the center of the core being considerably larger than the gas cells adjacent to the perimeter of the core so that the center of the core has greater resiliency than the portion adjacent to the perimeter.

In testimony whereof I affix my signature.

THOMAS J. BARKER.